United States Patent
Wood et al.

(10) Patent No.: US 9,553,909 B2
(45) Date of Patent: Jan. 24, 2017

(54) SYSTEM AND METHOD FOR ASSIGNMENT AND SWITCHING OF CONTENT SOURCES FOR A STREAMING CONTENT SESSION

(71) Applicant: Amazon Technologies, Inc., Seattle, WA (US)

(72) Inventors: James H. Wood, Seattle, WA (US); James Marvin Freeman, II, Seattle, WA (US); Wesley Shawn Davis, Seattle, WA (US); Jinesh U. Vora, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/828,417

(22) Filed: Aug. 17, 2015

(65) Prior Publication Data
US 2015/0358379 A1    Dec. 10, 2015

Related U.S. Application Data

(63) Continuation of application No. 13/051,886, filed on Mar. 18, 2011, now Pat. No. 9,112,948.

(51) Int. Cl.
*H04L 29/06* (2006.01)
*G06F 15/16* (2006.01)

(52) U.S. Cl.
CPC ............. *H04L 65/601* (2013.01); *H04L 65/80* (2013.01)

(58) Field of Classification Search
CPC ............................... H04L 65/601; H04L 65/80
USPC ........................................................ 709/231
See application file for complete search history.

(56) References Cited

U.S. PATENT DOCUMENTS

| | | |
|---|---|---|
| 7,454,485 B2 | 11/2008 | Kukkal |
| 7,860,964 B2 | 12/2010 | Brady et al. |
| 7,975,043 B2 | 7/2011 | Douglas et al. |
| 7,996,531 B2 | 8/2011 | Freedman |
| 8,108,507 B2 | 1/2012 | Weller et al. |
| 8,291,062 B2 | 10/2012 | Brown et al. |
| 8,296,396 B2 | 10/2012 | Farber et al. |
| 2006/0285556 A1 | 12/2006 | Schneck |

(Continued)

OTHER PUBLICATIONS

U.S. Appl. No. 13/051,890, filed Mar. 18, 2011, James H Wood.

*Primary Examiner* — Suraj Joshi
(74) *Attorney, Agent, or Firm* — Robert C. Kowert; Meyertons, Hood, Kivlin, Kowert & Goetzel, P.C.

(57) ABSTRACT

Various embodiments of a system and method for assignment and switching of content sources for a streaming content session are described. Embodiments may include the generation and use of content source rankings for improving playback quality of content streams. In embodiments, a merchant system may collect and aggregate multiple quality metrics for different content streams that various content sources provide to various clients. The merchant system may utilize the quality metrics to generate rankings of content sources for clients. The merchant system may provide such rankings to clients to improve the content stream playback experience on the client. For instance, at content acquisition time, a client may request a content stream from a content resource ranked highest on a content source ranking provided by the merchant. If the content stream degrades, the client may source subsequent portions of the content stream from another highly ranked content source of the ranking.

20 Claims, 9 Drawing Sheets

(56) References Cited

U.S. PATENT DOCUMENTS

| | | | |
|---|---|---|---|
| 2008/0072264 A1* | 3/2008 | Crayford | H04L 29/06027 |
| | | | 725/86 |
| 2008/0104228 A1* | 5/2008 | Dacosta | H04L 67/36 |
| | | | 709/224 |
| 2008/0147866 A1 | 6/2008 | Stolorz et al. | |
| 2008/0215747 A1 | 9/2008 | Menon et al. | |
| 2009/0034426 A1 | 2/2009 | Luft et al. | |
| 2009/0234940 A1* | 9/2009 | Pal | H04L 65/80 |
| | | | 709/224 |
| 2011/0078327 A1 | 3/2011 | Li et al. | |
| 2011/0082946 A1 | 4/2011 | Gopalakrishnan | |
| 2011/0138068 A1 | 6/2011 | Van Oldenborgh et al. | |
| 2011/0145386 A1 | 6/2011 | Stolorz et al. | |
| 2012/0042090 A1 | 2/2012 | Chen et al. | |

* cited by examiner

SYSTEM AND METHOD FOR ASSIGNMENT AND SWITCHING OF CONTENT SOURCES FOR A STREAMING CONTENT SESSION

This application is a continuation of U.S. patent application Ser. No. 13/051,886, filed Mar. 18, 2011, now U.S. Pat. No. 9,112,948, which is hereby incorporated by reference in its entirety.

BACKGROUND

The ubiquity of high-speed Internet access has paved the way for alternatives to traditional broadcast media (e.g., "over-the-air" broadcast, wired cable television, and satellite broadcast). For instance, to augment or replace broadcast media, consumers can rent, purchase, and/or subscribe to electronic content delivered over the Internet. As conventional broadcast media has generally employed mature technologies capable of providing seamless playback of content, consumers have grown to expect a high level of quality from the content viewing experience. From the content consumer's standpoint, the fact that streaming media is a relatively new technology in comparison to conventional broadcast media is no excuse for poor playback performance, such as playback interruption, rebuffering, and/or video quality degradation.

Networks for delivering streaming content to users over the Internet can be large, complex, and capital intensive to deploy and maintain. In some cases, merchants that offer electronic content over the Internet will enlist the services of a third party network provider. For instance, the merchant may have the proper rights or licenses to sell or rent content while opting to offload the actual content delivery to a third party. These third parties often include content delivery network (or content distribution network) ("CDN") providers. In these types of arrangements, the merchant may handle the business logic for selling or renting content to a customer while the CDN provider handles the delivery of streaming content to the customer's playback device.

While the system and method for assignment and switching of content sources for a streaming content session is described herein by way of example for several embodiments and illustrative drawings, those skilled in the art will recognize that the system and method for assignment and switching of content sources for a streaming content session is not limited to the embodiments or drawings described. It should be understood, that the drawings and detailed description thereto are not intended to limit the system and method for assignment and switching of content sources for a streaming content session to the particular form disclosed, but on the contrary, the intention is to cover all modifications, equivalents and alternatives falling within the spirit and scope of the system and method for assignment and switching of content sources for a streaming content session as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Figure 1:
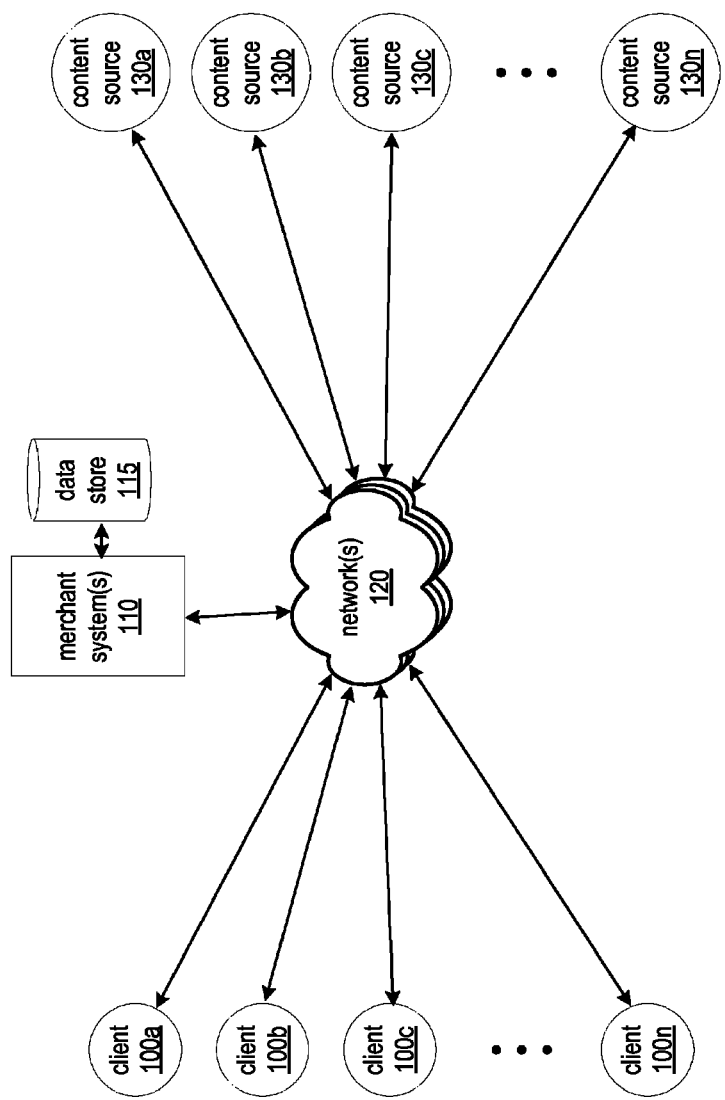
FIG. 1 illustrates a block diagram of an example system configuration including clients, content sources, and merchant systems, according to some embodiments.

Various embodiments of a system and method for assignment and switching of content sources for a streaming content session are described. FIG. 1 illustrates a block diagram of an example system configuration including clients, content sources, and merchant system(s). In the illustrated embodiment, clients 100a-n (collectively referred to as clients 100) may request electronic content from a merchant that owns and/or operates merchant system(s) 110. Examples of electronic content may include but are not limited to electronic representations of movies, music, and television programming. In one example, the merchant may sell or rent electronic content to clients through a commerce interface, such as a web portal configured to offer an electronic catalog of items as well as logic for accepting payment for items of such catalog. Merchant system(s) 110 may include systems configured to implement such a commerce interface. Clients 100 may carry out transactions for electronic content with merchant system 100 over one or more networks 120 that are configured to transport electronic representations of data or information. In various embodiments, network(s) 120 may include but are not limited to local area networks (LANs) (e.g., a corporate or Ethernet network), wide area networks (WANs) (e.g., the Internet), transit networks, internet service provider (ISP) networks, some other type of electronic network, or some combination thereof. In various embodiments, any communication between components or systems described herein (e.g., sending, receiving, providing, acquiring, transmitting, etc.) may be performed over network(s) 120.

In various embodiments, the merchant system(s) may rely on one or more content sources 130a-n (collective referred to as content sources 130) for the actual delivery of content to client systems 100. For instance, content sources 130 may store electronic content that the merchant offers for sale to clients. The content sources may charge the merchant a fee for delivery of such content to the clients.

Clients 100 may be implemented by one or more computers or electronic devices configured to receive (e.g., download) and playback electronic content from content sources 130. In various embodiments, clients 100 may include reporting logic configured to report quality metrics associated with content sources to merchant systems 110. For instance, when a given client system 100 is engaged in a streaming content session with one of content sources 130, the client system may record quality metrics associated with that session and send such metrics to merchant system(s) 100. In various embodiments, different clients of clients 100 may perform similar reporting actions. Merchant systems 110 may store the metrics for multiple sessions within data store 115 and use such metrics to generate rankings of content sources. A given ranking may rank content sources based on an expected measure of quality for a content stream between one of the content sources and one of the clients. In various embodiments, the merchant system(s) may generate a given ranking such that the cost of content delivery (e.g., the cost that content sources charge the merchant for delivering content to the clients) influences the rank of content sources.

Merchant system(s) 110 may provide such a ranking to a client for use in selecting a content source from which to acquire content. For example, when a client purchases content from the merchant, the merchant may provide the client with a ranking of content sources. In one example, the client may select the highest ranked content source and acquire content from the selected content source. In some cases, there may be instances in which the quality of a streaming content session does not meet requisite quality standards, even when the highest-ranked content source is utilized. For instance, temporary performance degradation at the content source and/or network latencies of network(s) 120 may cause the quality of a given streaming session to suffer. In these cases, a given client may switch to the next-highest ranked content source in the ranking received from the merchant system(s). It should be noted that the above operations are merely examples of techniques employed in various embodiments. Numerous variations and alternatives are described in more detail below with respect to subsequent Figures.

In the illustrated embodiment, content sources 130 may be implemented by one or more data servers or other electronic devices configured to provide (e.g., stream or transfer) data to clients 100. In various embodiments, one or more of content sources 130 may include a content delivery network (CDN), which may also be referred to as a content distribution network. In various embodiments, a given CDN may include one or more servers, routers, caches, and other components in order to provide content to multiple geographically-dispersed clients. In various embodiments, any given component of content sources 130 may be implemented on one or more computers, such as that of FIG. 10 described below. Data store 115 may implemented within memory of such a computer. In various embodiments, merchant system(s) 110 may include one or more computers or other electronic devices configured to perform the functionality described herein. In various embodiments, merchant system(s) 100 may be implemented on one or more computers, such as that of FIG. 10 described below. Likewise, clients 100 may each be implemented as one or more computers or other electronic devices configured to perform the functionality described herein. Examples of clients may include any computer or electronic device configured to playback (or "play") streamed content received from a remote entity. In various embodiments, such clients may include one or more buffers in which to store portions of such streamed content. For instance, a client may play content retrieved from its buffer such that nominal network variations or latencies do not affect the playback of the content. In some cases, a given client may fill its content buffer with data and then begin playback of the data from that buffer. Buffer sizes may be configurable to promote uninterrupted playback of content.

Figure 2:
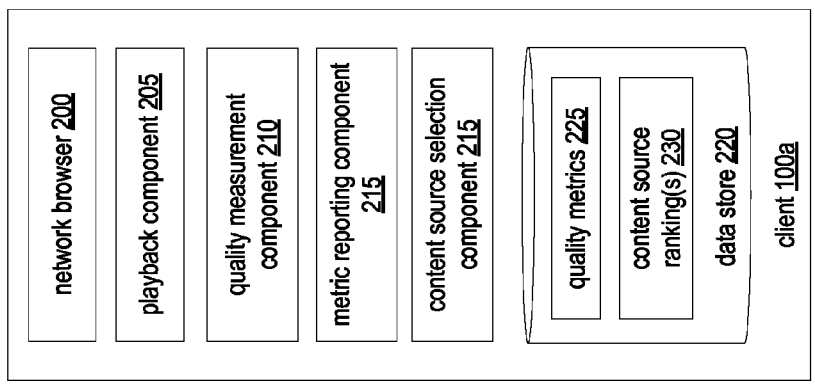
FIG. 2 illustrates a block diagram of an example client, according to some embodiments.

FIG. 2 illustrates a block diagram of an example client system according to various embodiments. The illustrated embodiment is directed to client 100a; however, it should be understood that any client of clients 100 may be configured similarly. In the illustrated embodiment, client 100a may include a network browser 200, such as a web browser or other application configured to access network content. In one example, network browser 200 may be utilized by a user (not illustrated) of client 100a to browse electronic content of an electronic catalog provided by the merchant. Network browser 200 may be utilized to select electronic content for playback on playback component 205. In various embodiments, playback component 205 may be a pre-existing component of client 100a. In other cases, playback component 205 may be acquired (e.g., downloaded) at content acquisition time. Playback component 205 may be configured to playback streaming content received from a content source specified by the merchant from which content was purchased or leased. For instance, playback component 205 may receive an identifier of a network location (e.g., a uniform resource locator or "URL") of a content source from which the content may be acquired. Various embodiments may also include receiving rankings of multiple content sources and using such rankings to select a content source. These embodiments are described in more detail below with respect to subsequent Figures.

Client 100a may also include a quality measurement component 210 configured to measure the playback quality of a content stream received from a particular content source. Quality measurement component 210 may store results of quality measurement as quality metrics 225 within data store 220. Quality metrics may include but are not limited to reliability metrics indicating whether an error caused a failure of the playback of the content stream, a rebuffering metric indicating whether the content stream was rebuffered one or more times during playback, or a video quality metric indicating whether the content stream was played back at a requisite resolution. In one example, playback failures may be caused by network failures, power outages, or anomalies at the content source. In another example, rebuffering may be caused by low bandwidth on the client side, network latencies at the content source, network latencies in a transit network between the content source and the client, or latencies introduced by the client's internet service provider. Similar events may cause a playback stream to playback at a lower-than-requisite resolution. For instance, a playback stream may be purchased at a specific resolution, such as a resolution corresponding to high definition (e.g., 720p or 1080p resolution). The purchased resolution may serve as the requisite or desired resolution for the stream. If the content stream is actually played back at less than the requisite resolution (e.g., played back in standard definition, such as 480p), the quality measurement component may record this occurrence within the video quality metric. In various embodiments, such metric may indicate the percentage of time (of the content streaming session) for which playback meets the requisite resolution and/or the percentage of time (of the content streaming session) for which playback does not meet the requisite resolution. A similar video quality metric may be implemented for a requisite or desired number of frames rendered per second.

As the client consumes one or more content streams over a period of time, the above-described metrics may be recorded as quality metrics 225. In some cases, the quality metrics may be stored as a cookie accessible to network browser 200. In other cases, the quality metrics may be stored according to some other format. The client may receive content streams from a variety of content sources over time. Accordingly, quality metrics 225 may represent metrics for multiple different content sources in various embodiments. As described in more detail below, some content sources may provide content streams with better playback performance (as measured by the metrics described herein) than other content providers. In various embodiments, different clients 100 may experience different performance from different content sources dependent upon various characteristics. For instance, clients in different geographic locations and/or clients with different Internet service providers may experience different playback performance of streaming content (as measured by the metrics described herein) from different content sources.

Metric reporting component 215 may provide the quality metrics described above to merchant systems(s) 110. This functionality may be performed by multiple clients of clients 100 (i.e., merchant system(s) 110 may receive quality metrics from multiple different clients). As described above, each client system may create quality metrics for content streaming sessions between that client and multiple different content sources. Merchant system(s) 100 may utilize these quality metrics from different clients to generate content source rankings. The manner in which merchant system(s) 110 generate content source rankings based on the quality metrics is described in more detail below with respect to subsequent Figures. In general, a given content source ranking may indicate multiple content sources each ranked on expected quality of a streaming content session between a particular content source and a particular client.

The client may also receive (e.g., via network browser 200) one or more content source rankings 230 from merchant system(s) 110. As described in more detail below with respect to later Figures, the client may utilize a content source ranking to select a content source from which to request a content stream.

Figure 3:
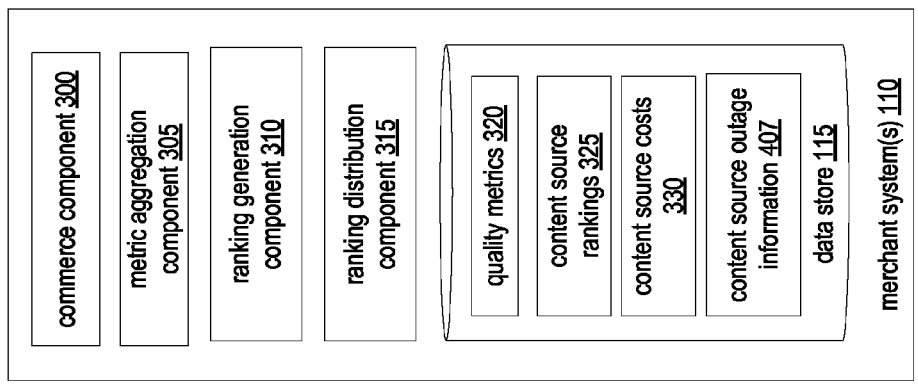
FIG. 3 illustrates a block diagram of an example merchant system, according to some embodiments.

FIG. 3 illustrates a block diagram of one example of merchant system(s) 110, according to some embodiments. Merchant system(s) 110 may include a commerce component 300 configured to implement a network-accessible commerce portal for streaming content. In various embodiments, commerce component may be configured to provide an electronic catalog of streaming content from which clients may select content for playback. In various embodiments, the commerce component 300 may also include functionality for processing one or more transactions, such as accepting payments for streaming content.

Merchant system(s) 110 may also include a metric aggregation component 305. As described above, different client systems may report quality metrics to merchant system(s) 110. Metric aggregation component 305 may receive and store these metrics within data store 115 as quality metrics 320. In some embodiments, a given metric may be stored along with various metadata about the content streaming session associated with that metric. For instance, such metadata may include the client location or the client's Internet service provider. In various embodiments, this information may be utilized to provide content source rankings that are individualized for specific clients, as described in more detail herein. Such rankings may be generated by ranking generation component 310. Content source rankings may be generated according to the techniques described herein and stored within data store 115 as content source rankings 325.

The merchant system(s) 110 may also include a ranking distribution component 315 configured to distribute content source rankings to any of clients 100. In various embodiments, ranking distribution component 315 may serve as an interface through which a given may request and receive one or more content source rankings individualized to that client. In some cases, ranking distribution component 315 may push rankings to various clients as necessary. In general, any technique for distribution information or data may be utilized by ranking distribution component 315 to provide rankings to clients.

As described in more detail below, merchant system(s) 110 may generate content source rankings on the basis of cost, among other factors. Data store 115 may store information about content source costs as content source costs 330. In various embodiments the merchant system(s) may receive this information from the individual content sources. In various embodiments, the merchant and content sources may agree to one or more contractual obligations that affect the price or cost of content delivery. Content source costs 330 may store the terms of any such obligations in various embodiments. In some cases, contractual obligations may also specify that a certain quantity of content source bandwidth be utilized (e.g., for a fixed cost on a use-it-or-lose-it basis). In addition to the quality metrics and content delivery costs described herein, the merchant systems may also generate content source rankings based on such contractual obligations. For instance, content sources with which the merchant has contractual obligations may be ranked higher than other content sources in an effort to promote there use, according to some embodiments. In addition to content source costs, the merchant's data store may also store content source outage information 407 received from one or more of the content sources. Content source outage information is described in more detail below with respect to subsequent Figures.

Figure 4A:
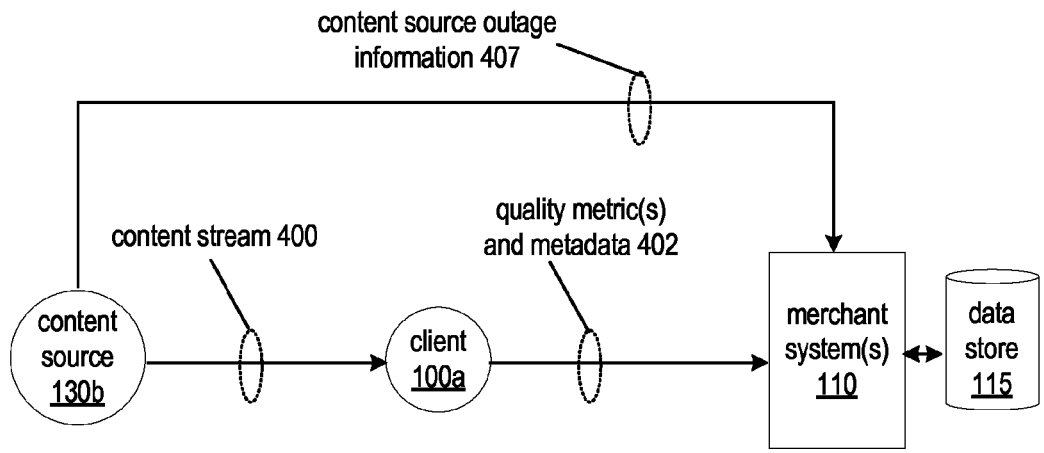
FIG. 4A illustrates an example flow diagram of quality metric collection, according to some embodiments.

In various embodiments, the content source rankings used by clients to select a content source for streaming content may be generated based on quality metrics captured by merchant system(s) 110. FIG. 4A illustrates an example flow diagram for the collection of quality metrics for a content streaming session, according to various embodiments. In the illustrated embodiment, content source 130b may provide a content stream 400 to client 100a. For instance, content stream 400 may be a streaming movie (or other electronic content) played on client 100a. Client 100a may generate one or more metrics and associated metadata about this streaming session. For instance the quality measurement component 210 (illustrated in FIG. 2) may capture such metrics and metadata. In various embodiments, client 100a may provide the metrics and metadata to merchant system(s) 110, as illustrated by quality metric(s) and metadata 402. The merchant system(s) 110 may store such metrics within data store 115 (e.g., as quality metrics 320). In various embodiments, the metric collection process illustrated in FIG. 4A may be repeated for multiple content streaming sessions. Each content streaming session may be performed between a given client—content source pair.

In various embodiments, content sources may also report outage information (illustrated as content source outage information 407) to the merchant systems. This information may include information pertaining to service outages (e.g., planned maintenance and/or unplanned outages) and/or equipment failure (e.g., server failure). In various embodiments, this information may be utilized to influence content source rankings, as described in more detail below.

Figure 4B:
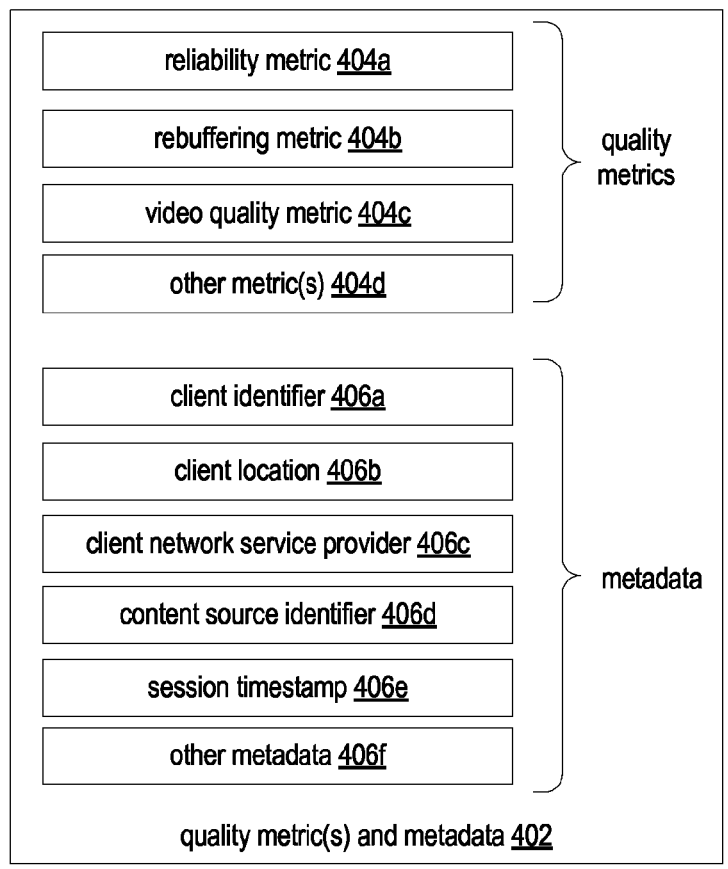
FIG. 4B illustrates a block diagram of example quality metrics and associated metadata, according to some embodiments.

FIG. 4B illustrates an example block diagram of the quality metric(s) and metadata 402 that may be collected by the client and reported to the merchant system, according to various embodiments. In the illustrated embodiment, such information may include quality metrics 404a-d and metadata 406a-f. As illustrated, the quality metrics may include a reliability metric 404a that indicates whether one or more errors caused a failure of the playback of the content stream. The quality metrics may also include a rebuffering metric 404b that indicates whether the content stream was rebuffered one or more times during playback on the client. The quality metrics may further include a video quality metric 404c that indicates whether the content stream was played back at a requisite resolution. As described above, playback failures may be caused by network failures, power outages, or anomalies at the content source. In another example, rebuffering may be caused by low bandwidth on the client side, network latencies at the content source, network latencies in a transit network between the content source and the client, or latencies introduced by the client's internet service provider. Similar events may cause a playback stream to playback at a lower-than-requisite resolution. For instance, a playback stream may be purchased at a specific resolution, such as a resolution corresponding to high definition (e.g., 720p or 1080p resolution). The purchased resolution may serve as the requisite or desired resolution for the stream. If the content stream is actually played back at less than the requisite resolution (e.g., played back in standard definition (e.g., 480p), the quality measurement component of the client may record this occurrence within video quality metric 404c. In various embodiments, such metric may indicate the percentage of time (of the content streaming session) for which playback meets the requisite resolution and/or the percentage of time (of the content streaming session) for which playback does not meet the requisite resolution. One or more other metric(s) 404d may also be collected in some embodiments. For instance, in some embodiments, other metrics 404d may include a metric that specifies whether playback of the content met a requisite quantity of frames per second.

In various embodiments, metadata may be captured about the content streaming session in which the metrics were captured. Such information is presented in the illustrated embodiment as metadata 406a-f. In various embodiments, this metadata may assist merchant system(s) 110 during the creation of content source rankings, as described in more detail below with respect to subsequent Figures. In the illustrated embodiment, client identifier 406a may include an identifier of the client (in this case client 100a). The identifier may include an identifier of the client itself (e.g., a media access control (MAC) address, serial number, or some other unique identifier of the client) or an identifier of the network location of the client (e.g., an internet protocol (IP) address). Client location 406b may include a physical location of the client or region in which the client resides. Client location 406b may include a physical address (e.g., a street address, coordinates, etc.) or regions of varying granularity (e.g., county, city, state, country, etc.) in which the client resides or is known to reside. Client network service provider 406c may include an identifier or name of the network service provider through which the client receives network access, such as an internet service provider (ISP). Session timestamp 406e may include a timestamp associated with the streaming content session. The timestamp may specify a start time for the session, end time for the session, or range of time in which the session occurred, for example. In various embodiments, different granularities of time may be used to express such timestamp (e.g., including but not limited to second, hours, days, months, etc). In various embodiments, other metadata 406f may be captured for a streaming content session including but not limited to measured connection speed or network throughput of the client at the time of the streaming session, a device type (e.g., computer, electronic device, mobile device, etc.), hardware capabilities (e.g., processor type or clock speed, total memory, available memory, installed applications), or other information about the client or streaming content session. The metadata described herein may be utilized by merchant system(s) 110 to generate content source rankings, as described in more detail below.

Figure 5A:
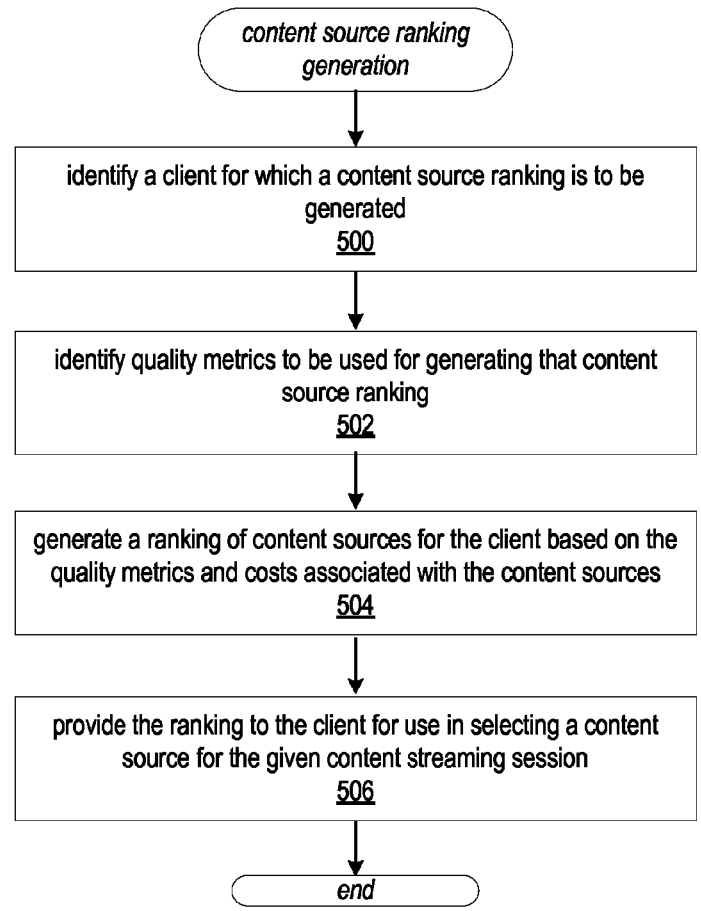
FIG. 5A illustrates a flowchart of an example method for generating content source rankings, according to some embodiments.
Figure 5B:
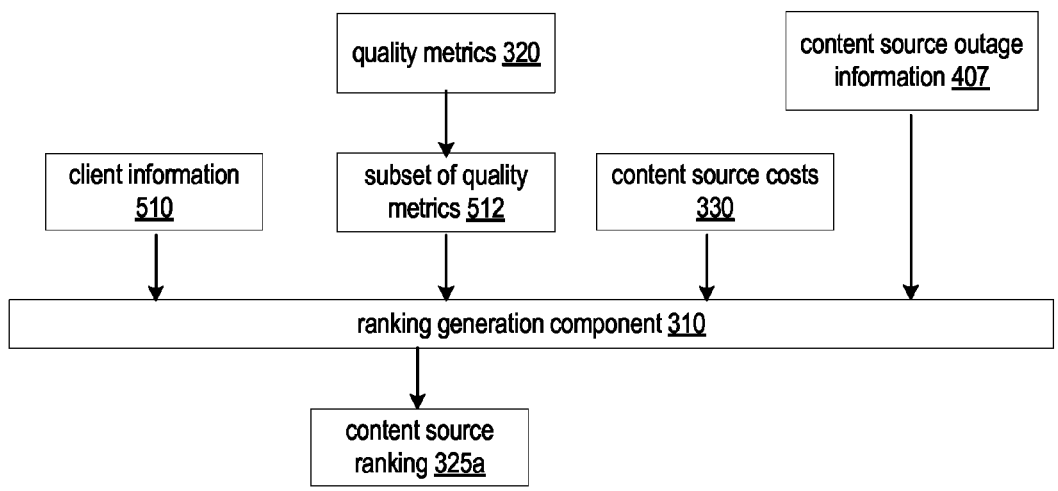
FIG. 5B illustrates a data flow diagram of an example method for generating a content source ranking, according to some embodiments.

FIG. 5A illustrates a flowchart of an example method for generating a ranking of content sources for a client. As described in more detail with respect to later Figures, the client may utilize the content source ranking to select a content source from which to receive streaming content. In various embodiments, the method of FIG. 5A may be performed by merchant system(s) 110. For instance, the illustrated method may be performed by ranking generation component 310, as illustrated in FIG. 5B, which may be collectively referenced herein with FIG. 5A. In various embodiments, the method of FIG. 5A may be implemented by one or more computer systems, such as that of FIG. 10 described below.

As illustrated at block 500, the method may include identifying a client for which a content source ranking is to be generated. In some embodiments, such a client may be identified responsive to receiving a request for a content source ranking from that client. In other cases, the illustrated method of generating a content source ranking may be performed for each of one or more multiple clients. In the description provided herein, the method is described as being performed for a particular client (e.g., the ranking generated may be specific to that particular client). However, it should be understood that the method may be similarly performed for a group of clients sharing certain characteristics (e.g., different types of clients may share different properties, such as geographic location and/or ISP). In this case, the ranking generated may be specific to that particular group of clients. In FIG. 5B, the client for which the ranking is to be generated may be identified by client information 510, which may specify various information about the client including but not limited to a client identifier (e.g., similar to client identifier 406a described above), a client location (e.g., similar to client location 406b described above), a client network service provider (e.g., similar to item 406c described above), or other information about the client (e.g., similar to item 406f described above).

As illustrated at block 502, the method may include identifying quality metrics to be used to for generating the content source ranking for the client. In various embodiments, this portion of the method may include determining that all available quality metrics (e.g., quality metrics 320)

may be utilized to generate the ranking. In other cases, a subset of the available quality metrics may be selected for use in generating a content source ranking. In FIG. 5B, this subset is illustrated as subset of quality metrics 512. In various embodiments, determining the subset may include selecting one or more client properties and identifying quality metrics that share those properties (e.g., as specified by the metadata of those quality metrics). This portion of the method may be described with reference to FIG. 6.

Figure 6:
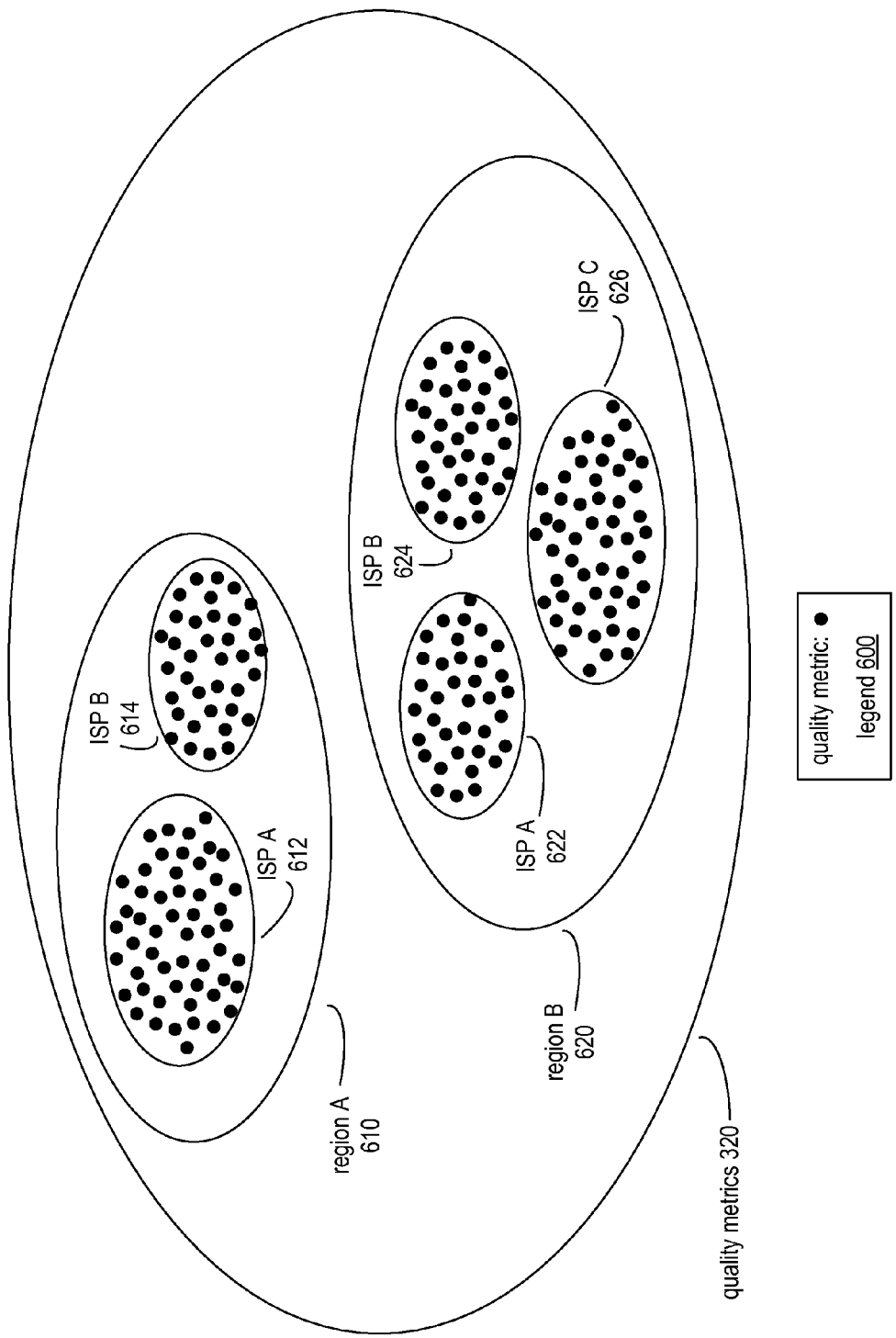
FIG. 6 illustrates a logical representation of the aggregation and categorization of quality metrics, according to some embodiments.

FIG. 6, which is collectively described with FIGS. 5A-B herein, illustrates quality metrics 320 categorized by various properties. As noted by legend 600, each quality metric is denoted by a filled circle. In the illustrated embodiment, the quality metrics are first categorized by client location. Note that a given quality metric's client location may be determined from its metadata (see e.g., FIG. 4B). In the illustrated example, quality metrics are categorized into metrics having a location within region A (item 610) and region B (item 620). For the quality metrics of each region, the quality metrics maybe further categorized on the basis of network service provider. In the illustrated embodiment, the quality metrics of region A are categorized into different groups 612 and 624 corresponding to ISP A and ISP B, respectively. Similarly, the quality metrics of region B are categorized into different groups 622, 624 and 626 corresponding to ISP A and ISP B, and ISP C, respectively.

Returning to block 502, as described above, the method may include identifying a subset of quality metrics by selecting one or more client properties and identifying quality metrics that share those properties (e.g., as specified by the metadata of those quality metrics). In one non-limiting example, the method may include selecting such properties as being a particular client location (e.g., "region A") and a particular network service provider (e.g., "ISP A"). The method may include identifying quality metrics that share these properties (e.g., as indicated by the metadata of such metrics). In the illustrated example of FIG. 6, this may include identifying the subset of quality metrics 512 as being the metrics illustrated at 612. By selecting metrics that are tailored to a particular client using the techniques described above, the method may generate rankings that are more pertinent to a particular client relative to a ranking created from the entire population of available metrics.

As illustrated at block 504, the method may include generating a ranking of content sources for the client based on the quality metrics (identified at 502), costs associated with the content sources (e.g., as specified by content source costs 330), and other information as described below. In various embodiments, this portion of the method may include a statistical and/or mathematical analysis on the identified metrics and content source costs in order to generate a ranking of content sources in which each content source is ranked on expected quality of a streaming session between that content source and the particular client. In various embodiments, the method may include scoring content sources based on different types of quality metrics collected from client for those content sources. For instance, each content source may be given different scores based on the reliability metrics, rebuffering metrics, and video quality metrics associated with those content sources. (Note that a metric may be associated with a particular content source if that metric's metadata identifies that content source, such as described above with respect to content source identifier 406d.) The scores may be summed according to a standard sum or a weighted sum. The result of the sum may be a value by which the content sources are ranked; an example of such a ranking is illustrated in FIG. 7, which is described in more detail below.

Figure 7:
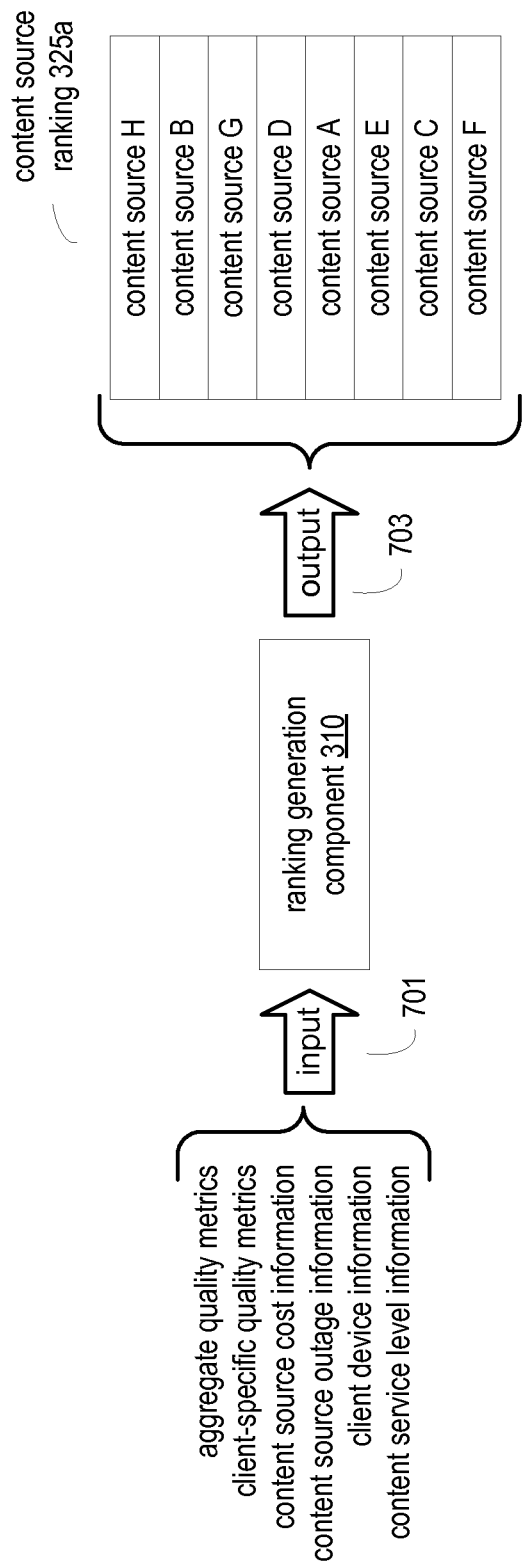
FIG. 7 illustrates a block diagram of an example generation of a content source ranking, according to some embodiments.

FIG. 7 illustrates another example of the generation of a content source ranking for a specific client, according to some embodiments. In the illustrated embodiment, a content source ranking 325a (illustrated as output 703) may be generated based on information from multiple data sources, such information illustrated as input 701 to ranking generation component 310. The ranking generation component may generate content source ranking 325a based on any combination of the illustrated input in various embodiments.

As illustrated, input 701 may include aggregate quality metrics. Aggregate quality metrics may include any aggregation of metrics described above (e.g., reliability metrics, rebuffering metrics, video quality metrics, etc.) pertaining to clients other than the client for which the ranking is being generated. The illustrated aggregate quality metrics may also include information derived from the quality metrics of multiple clients, such as average performance across multiple clients or other results of a statistical analysis performed on aggregate rankings of multiple clients. Such analysis may also be performed across one or more variables, such as region, internet service provider, device type, or other variables. For instance, aggregate quality metrics may specify average performance of different content sources with respect to serving clients in different regions. For example, aggregate quality metrics may specify that some content sources are performing better than others at serving clients of a particular region and/or Internet service provider.

The quality metrics pertaining to the client for which the ranking is to be generated are illustrated as client-specific quality metrics in the illustrated embodiment. These metrics may differ from the aggregate quality metrics in that they pertain specifically to the client for which the content source ranking is generated. In one example, client-specific quality metrics may for a given client may include metrics (e.g., reliability metrics, rebuffering metrics, video quality metrics, etc.) reported by that client to the merchant system, such as described above with respect to FIG. 4A. In various embodiments, the ranking generation component may take both aggregate quality metrics and client-specific quality metrics into consideration when generating a content source ranking. For example, in some cases, ranking generation component may be configured to generate a content source ranking 325a (illustrated as output 703) based on a weighted sum or other aggregation of quality metrics (and other data as described below). For instance, in a weighted sum approach, the client-specific quality metrics may be weighted more heavily than the aggregate metrics (or vice-versa in other cases). In some embodiments, this weighted approach may be performed on the granularity level of individual metrics. In one non-limiting example, the client-specific metrics could be favored for the rebuffering metric whereas the aggregate quality metrics could be favored for the video quality metric. Other variations along these lines are possible and contemplated. For instance, this weighted approach may also take into consideration any of the other information or data illustrated as input 701. In some cases, all of the information illustrated as input 701 may be integrated into one holistic analysis for determining a content source ranking for a client. In one non-limiting example, each portion of information could be weighted and aggregated according to the weighted sum approach described above. Additional details about the other information that makes up input 701 are described below.

Also illustrated, the ranking generation component may be configured to generate the content source ranking based on content source costs (e.g., content source costs 330). As described above, this information may specify the costs incurred by the merchant to have one or more of the content sources provide streaming content to clients. In various embodiments, there may also be a threshold of acceptable performance above which a given client is unlikely to see performance gains. For instance, in many cases, streaming content may be standardized for playback, such as by frame rate, bitrate and/or resolution. One example of such streaming content may include a movie formatted to the following parameters: 720p resolution at 30 frames per second with a bitrate of 3 Megabits per second. In this example, as long as a content source is capable of streaming this content at a level that maintains the standards of the movie, delivering the content from another content source with higher performance will not result in a substantially better viewing experience (if any) from the perspective of the client. Embodiments may take this property into consideration by cost-adjusting the rank of content sources that meet or exceed a requisite level of performance. For instance, with respect to two or more content sources that meet (or are expected to meet) and acceptable level of performance, the ranking generation component may give preference (e.g., higher ranking) to content sources with less expensive content delivery costs. As described in more detail below, clients may be configured to use higher ranked content sources before lower ranking content sources when requesting streaming content. Accordingly, by cost-adjusting the rankings as described above, embodiments may reduce the aggregate quantity of funds that the merchant expends on content delivery costs.

As illustrated, ranking generation component may also generate a content source ranking based on content source outage information (e.g., content source outage information 407 of FIG. 4). As described above, this information may include information pertaining to service outages (e.g., planned maintenance and/or unplanned outages) and/or equipment failure (e.g., server failure). In various embodiments, content source outage information may specify exact or approximate time periods in which a particular content source (or particular server or range of servers) will not be available for content delivery. In one non-limiting example, for a service outage of a particular content source, the ranking generation component may be configured to heavily down-rank that content source during the time period in which service is impaired or suspended. In other cases, the merchant system may provide a message to the client such that the client may avoid use of a content source experiencing a service outage.

As illustrated, the ranking generation component may also be configured to generate a ranking based on client device information, which may include a device type (e.g., desktop, laptop, mobile device, smartphone, etc.) and or device capabilities (e.g., a content player version). In various embodiments, this information may be utilized to filter the data set upon which the ranking is generated. For instance, with respect to the aggregate metrics described above, ranking generation component may be configured to only use metrics collected from a specific device type (e.g., the device type that matches the device type of the client for which the ranking is being generated).

As illustrated, the ranking generation component may also be configured to generate a ranking based on content service level information. Content service level information may specify service level associated with the content for which the content source ranking is being generated. In one-non limiting example, there may be different service levels for free content and premium content (i.e., paid content). The ranking generation component may utilize the content service level information to influence content source ranking 325*a*. In one non-limiting example, a content source ranking for premium content may be populated with generally higher quality, higher cost content sources whereas a content source ranking for free content may be populated with generally lower quality, lower cost content sources.

Note that while the generation of content source rankings is largely described herein as being implemented by logic of the content source rankings, such logic may instead by implemented on the client in various embodiments. For instance, one or more of the clients described herein may include a ranking generation component 310. In such embodiments, the client may receive some or all of the information described above as input 700 (aggregate quality metrics, etc.) from the merchant system(s) and generate a content source ranking based on that information. Generally, any functionality described herein with respect to ranking generation component 310 may be implemented on any of clients 100*a-n* in some embodiments.

Figure 8:
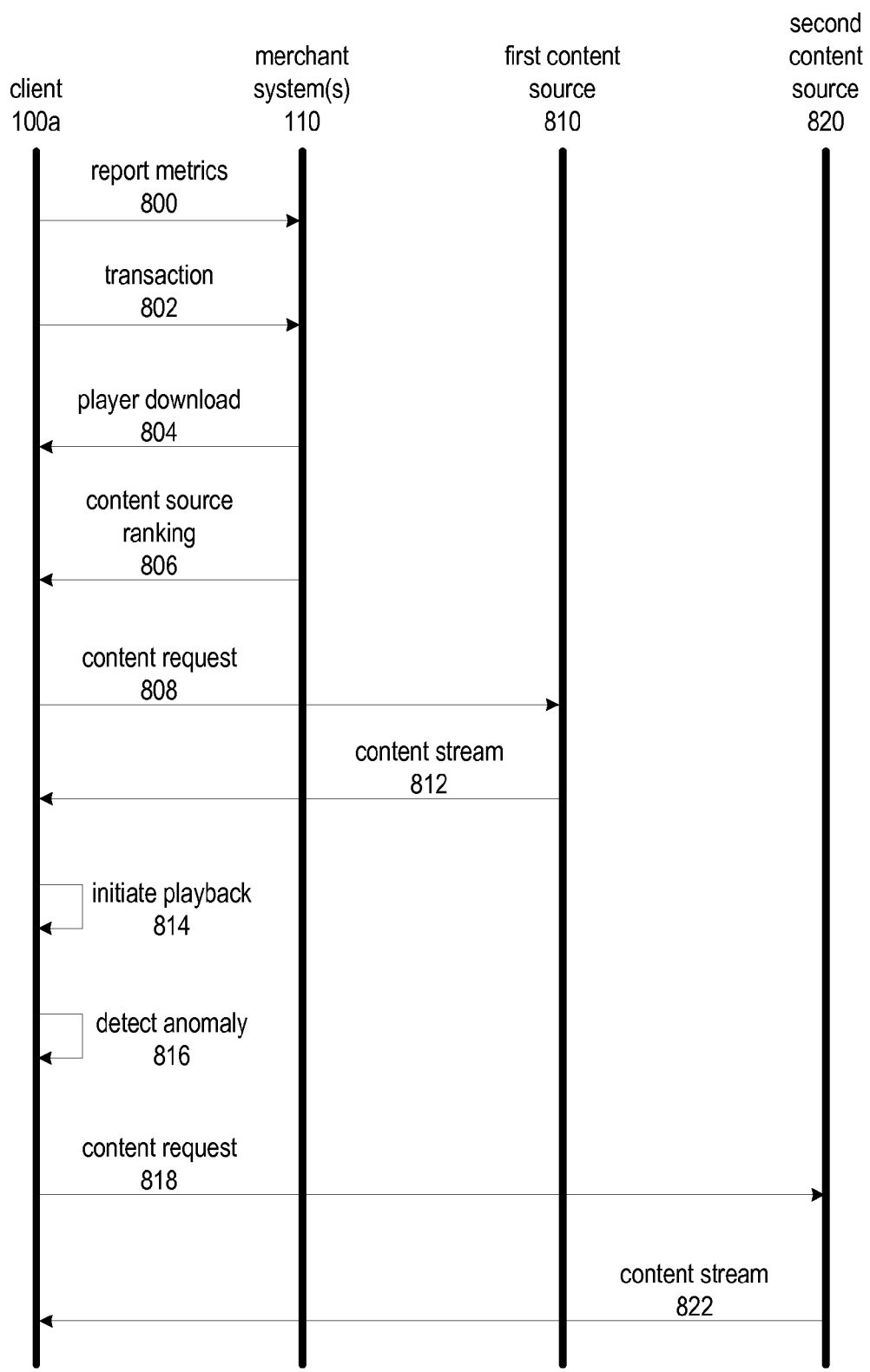
FIG. 8 illustrates a flow diagram of example interactions between a client, merchant and content source during a content streaming session, according to some embodiments.

FIG. 8 illustrates an example flow diagram demonstrating the use of a content source ranking by a client to acquire content. In the illustrated embodiment, the client is illustrated as client 100*a*; however, any of clients 100 may be configured similarly. Also note that while various operations are illustrated in FIG. 8, not all embodiments require such operations to be performed. Similarly, in various embodiments, additional operations or actions not illustrated may be performed.

At 800, client 100*a* may provide one or more client-specific metrics to the merchant. In some cases, this may be performed over a particular time period (e.g., over the most recent day or a range of hours). In various embodiments, this portion of the flow may be performed similar to the metric reporting illustrated in FIG. 4A. At 802, client 100*a* may initiate a transaction 802 to purchase or rent streaming content from merchant system(s) 100. In various embodiments, the client may interact with commerce component 300 (described above) to carry out the transaction. In one example, client 100*a* may provide merchant system(s) 110 with a selection of content (e.g., from the merchants electronic catalog) as well as payment information for the selected content. In other cases, the payment information may be pre-stored with the merchant. In yet other embodiments, no transaction may be necessary. For instance, in cases where streaming content is provided at no cost, client 100*a* may provide a selection of streaming content without necessarily performing a transaction.

At 804, client 100*a* may download or otherwise receive a streaming content player from the merchant. For instance, client 100*a* may be a computer and the player may be processor-executable application downloaded to the client over a network (e.g., network(s) 120). In other cases, client 100*a* may already include such application (e.g., from a previous content streaming session) and the client may forgo downloading the player. In other cases, client 100*a* may be a device configured to play streaming content without a player application. For instance, client 100*a* may include dedicated hardware logic to playback content streams. In general, client 100*a* may be configured as a variety of electronic devices configured to playback a streaming content including but not limited to a computer configured to play a content stream with a playback application, an electronic set top box configured to playback a content stream, or a mobile device (e.g., a smartphone or tablet device) configured to playback a content stream.

At 804, client 100a may receive a content source ranking 806 from merchant system(s) 110 (e.g., from ranking distribution component 815). In various embodiments, the content source ranking may specify multiple content sources where each content source is ranked (relative to the other content sources) on an expected measure of quality for playback of streaming content to be provided by that. In various embodiments, this content source ranking may be generated by merchant system(s) 110 based on quality metrics (e.g., quality metrics 320) and/or content source costs (e.g., content source costs 330), according to any of the techniques described herein.

Client 100a may evaluate the content source ranking to identify a content source from which to request the streaming content selected at 802. In various embodiments, client 100a may select the highest-ranked content source from the ranking. In other cases, other techniques may be utilized to select the content source from the ranking, such as those described below with respect to FIG. 9. At 808, client 100a may provide a request to the selected content source 810. The request may specify the content requested and any other information pertaining to the acquisition of the content stream, such as a content range (e.g., a range specifying which portion of the content stream is requested), or authentication/authorization information for accessing the content.

At 812, if the request is accepted, the first content source 810 may initiate transfer of the content stream to client 100a. Client 100a may begin to receive the content stream at 812. In various embodiments, client 100a may buffer a portion of the content to accommodate variances in content stream throughput. In one non-limiting, the client may buffer a 5 second segment of the streamed content. After the filling the buffer to the specified level, the client may initiate playback of the content stream at 814.

In some cases, client 100a may detect an anomaly and use the content source ranking to select a new content source to switch to in an effort to overcome any undesirable characteristics in playback of the content stream. In various embodiments, client 100a may continuously, periodically, or aperiodically monitor the content stream for anomalies. In various embodiments, detecting an anomaly may include determining that playback of the content stream on client 100a has failed to meet one or more quality standards including but not limited to standards for acceptable quantities of errors resulting in stoppage of content playback, acceptable quantities of rebuffering instances, and/or acceptable levels for playback resolution and/or bitrate. In various embodiments, if client 100a determines that playback of the content stream is not meeting the aforesaid quality standards (e.g., due to poor network throughput or poor content source performance), client 100a may determine that an anomaly has been detected (816).

In response to detecting the anomaly, client 100a may switch content acquisition to another content source. In the illustrated embodiment, this may be performed by requesting content at 818 from the second content source 820. In various embodiments, client 100a may select the second content source 820 from the content source ranking. In one example, content source 820 may be the next-highest ranked content source (relative to the first content source 810). In some cases, client 100a may switch to a particular content source according to the techniques described below with respect to FIG. 9. At 818, client 100a may receive a subsequent portion of the same content stream from the second content source, as illustrated at 822. In this way, the client may utilize the content source ranking described herein to improve the playback of the content stream, even in cases where anomalies (e.g., playback failure, rebuffering, poor resolution) occur.

Figure 9:
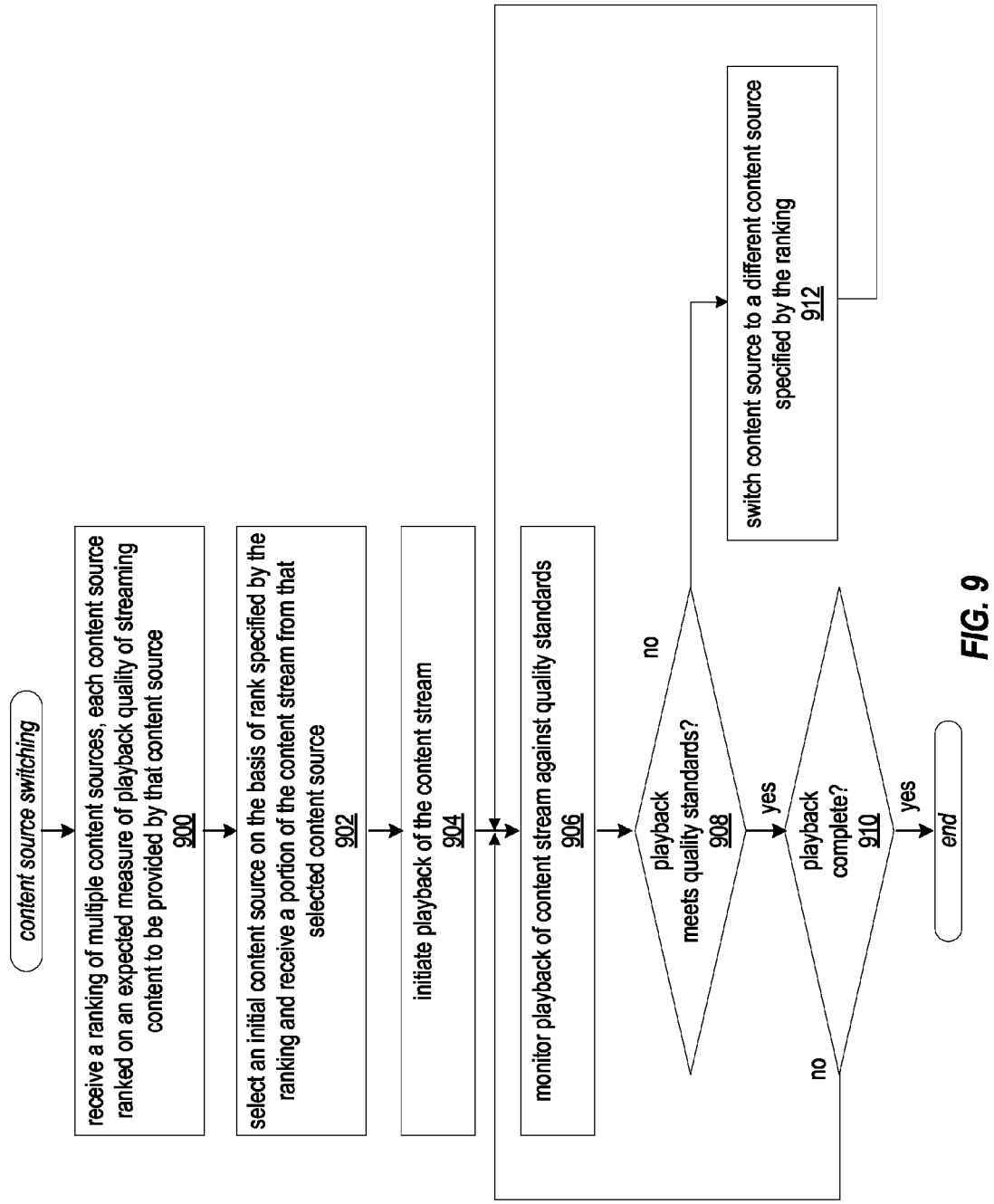
FIG. 9 illustrates a flowchart of an example method for switching content source rankings based on a merchant-generated content source ranking, according to some embodiments.

FIG. 9 illustrates a flowchart of an example method for using a content source ranking to improve playback quality of a content stream. In various embodiments, the illustrated method may be implemented by a client, such as any of clients 100 described above. In some embodiments, the illustrated method may be performed by a computer, such as that of FIG. 10 described below. As illustrated at block 900, the method may include receiving a ranking of multiple content sources. In the ranking, each content source may be ranked on an expected measure of quality of playback of streaming content to be provided by that content source. In various embodiments, this ranking may similar to any of the content source rankings described herein. For instance, the ranking may be generated based on quality metrics (e.g., quality metrics 320) and/or content source costs (e.g., content source costs 330). One example of such a ranking includes cost-adjusted ranking 325a described above.

At 902, the method may include selecting an initial content source on the basis of rank specified by the ranking and receiving a portion of the content stream from that selected content source. In various embodiments, the selection of the initial content source may be performed according to different techniques. In one embodiment, the method may include selecting the highest-ranked content source that has not been used during the current content streaming session. In some cases, a similar technique may be utilized with the additional aspect of testing the viability of the content source prior to using that content source for acquiring the actual content stream. For instance, the method may include, as a prerequisite for requesting a portion of the content stream from a content source, testing the content source to determine that the content source is expected to meet quality standards for the content stream. (Example quality standards are described above with respect to FIG. 8 and below with respect to item 908.) One technique for testing the content source may include determining whether the network throughput from the content source meets or exceeds a threshold value of network throughput. In various embodiments, the content source may be expected to meet the quality standards for the content stream if the network throughput (e.g., network throughput between the content source and the client) meets the threshold value. While this test is described as being performed for the initial content source selection, a similar test may be performed prior to requesting content from any content source.

As illustrated at 904, the method may include monitoring playback of the content stream (e.g., on the client) against one or more quality standards. This may be done on a continual, periodic, or aperiodic basis, according to various embodiments. These quality standards may include but are not limited to standards for acceptable quantities of errors resulting in stoppage of content playback, acceptable quantities of rebuffering instances, and/or acceptable levels for playback resolution and/or bitrate. In various embodiments, if client 100a determines that playback of the content stream does meet the quality standard(s), the method may proceed to block 910, as illustrated by the positive output of block 908. If client 100a determines that playback of the content stream does not meet the quality standard(s), the method may proceed to block 912, as illustrated by the negative output of block 908.

At block 912, the method may include switching to a different content source specified within the ranking. In various embodiments, this portion of the method may include selecting the highest-ranked content source that has not been used during the current content streaming session, and requesting content from that content source. As is the case with the initial content source (block 902), this portion of the method may include, as a prerequisite for requesting a portion of the content stream from a given content source, testing the content source to determine that the content source is expected to meet quality standards for the content stream (e.g., through a network throughput test). In other embodiments, the method may include utilizing historical information about the content sources to eliminate the need to perform such a test. For instance, as described above with respect to FIG. 2, the client may locally store historical information about content sources, such as quality metrics 225 (e.g., metrics stored in a web browser cookie). In various embodiments, if the historical information indicates that use of the content source being considered has resulted in positive performance (e.g., use of the content source has historically caused content playback to meet quality standards), then the method may include bypassing the test on the content source; instead, the method may directly request the content from the content source without performing the test described above. Similarly, if the historical information indicates that use of the content source being considered has resulted in negative performance (e.g., use of the content source has historically caused content playback to fail to meet quality standards), then the method may include bypassing the test on the content source; instead, the method may proceed to evaluate the next-highest ranked content source that has not been used during the current content streaming session. After block 912, the method may proceed to block 906.

In various embodiments, the merchant may be detect that one or more content sources will be experiencing a service outage (e.g., will not be providing streamed content) for a particular period of time. For instance, in various embodiments, merchant system(s) 110 may send a notification to clients 100 to indicate that one or more content sources will be experiencing an outage as well as any information known about the time at which such outage is expected to occur. In various embodiments, the method may include receiving such information and eliminating such content source(s) from consideration during the time period of the outage. For instance, as a prerequisite for switching to a particular content source, the method may in various embodiments include ensuring that that content source is not currently experiencing a service outage.

At block 910, the method may include determining whether playback of the content stream is complete. If it is determined that playback is not complete, the method may proceed to block 912. If it is determined that playback is complete, the method may end.

In various embodiments, numerous variations and modifications to the techniques described above may be implemented. As described above, in some embodiments, a content source that has failed to meet quality standards may be eliminated from consideration for the remainder of the content streaming session. However, in other embodiments, after a certain period of time (which may be configurable), the client system may be configured to re-check the viability of a previously used content source. In various embodiments, this technique may be utilized to reduce content delivery costs in the aggregate since in many embodiments higher-ranked content sources may be less expensive to the merchant when compared to lower ranked content sources. For instance, consider a scenario where content source H of cost-adjusted ranking 325*a* were to fail to meet quality standards. In this instance, the client may switch to content source B (e.g., a more expensive content source from the merchant's perspective). In accordance with the techniques described above, at some configurable amount of time in the future, the client may re-check the viability of content source H. In cases where content source H has overcome any transient conditions that previously caused poor performance, the client may return to utilizing content source H to receive streaming content during the same session. In this way, the merchant may reduce or minimize expenditures on content delivery.

In various embodiments, merchant system(s) 110 may continually, periodically, or aperiodically update content source rankings (e.g., content source rankings 325) as new quality metrics 320 are received from various clients 100. In other words, merchant system(s) 110 may keep the rankings up to date based on the most recent metrics. In various embodiments, the rankings may be generated on a configurable window of time from the current time. In one non-limiting example, content source rankings may be generated based on metrics from only the last 8 hours. Due to this dynamic nature of the content source rankings, merchant system(s) 110 may send updated may send updated or new content source rankings to clients in various embodiments. In various embodiments, clients may be configured to immediately begin utilizing the new rankings for the selection of content sources, even in cases where a content streaming session is currently in-progress on the client.

Example Computer System

Various embodiments of the system and method for assignment and switching of content sources for a streaming content session, as described herein, may be executed on one or more computer systems, which may interact with various other devices. Note that any component, action, or functionality described above with respect to FIGS. 1-9 may be implemented on one or more computer systems configured as computer system 1000 of FIG. 10, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement any functionality of the clients or merchant systems described above. Additionally, data 1032 of memory 1020 may store any of the information or data structures described above, including but not limited to quality metrics and content source rankings. In some embodiments, program instructions and/or data may be received, sent or stored upon different types of computer-accessible media or on similar media separate from system memory 1020 or computer system 1000. While computer system 1000 is described as implementing the functionality of clients or merchant systems, any of the items described above (e.g., content sources, etc.) may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., any element of FIG. 1-9) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In some embodiments, network(s) 120 of FIG. 1 may include one or more networks configured similarly to network 1085. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
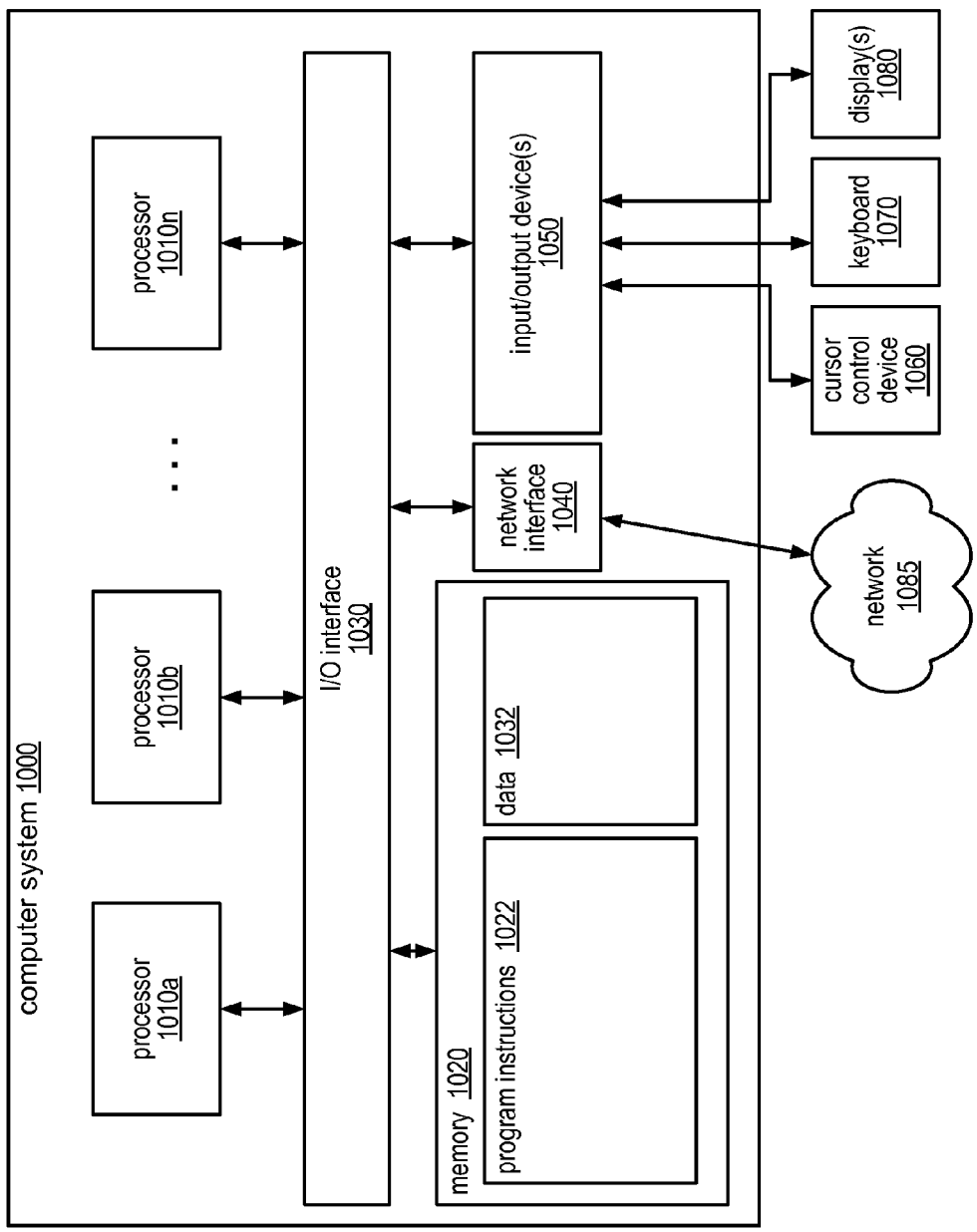
FIG. 10 illustrates one example of a computer system suitable for implementing various elements of the system and method for assignment and switching of content sources for a streaming content session, according to some embodiments.

As shown in FIG. 10, memory 1020 may include program instructions 1022 configured to implement any element or action described above. In one embodiment, the program instructions may implement the methods described above, such as the methods illustrated by FIGS. 5A and 9. In other embodiments, different elements and data may be included. Note that data 1032 may include any data or information described above, including but not limited to the information of data stores 115 and 220.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
one or more memories; and
one or more processors coupled to the one or more memories, wherein the one or more memories comprise program instructions executable by the one or more processors to:
receive, at a computer system from a plurality of remotely located clients, wherein the computer system is separate from the plurality of remotely-located clients, quality metrics for a plurality of streaming content sessions, each quality metric indicating a measure of quality of playback of streamed content of the streaming content sessions;
generate, at the computer system, a ranking of content sources based on at least some of the quality metrics, wherein a given ranking specifies multiple content sources each ranked on expected quality of a streaming content session between a respective content source and a respective client; and
provide the generated ranking of content sources to one or more clients for use in selecting, during a first portion of a given streaming content session and in response to performance degradation of a first content source, a second content source to switch to for a second portion of the given streaming session.

2. The system of claim 1, wherein the quality metrics for a given streaming content session include one or more of:
a network throughput metric indicating whether a network throughput of a content source associated with the given streaming content session met or exceeded a threshold value,
a reliability metric indicating whether a playback failure occurred during the content session,
a rebuffering metric indicating whether a content stream was rebuffered one or more times during content playback, or
a video quality metric indicating whether a content stream was played back at a requisite resolution.

3. The system of claim 1, wherein the second content source comprises a next-highest ranked content source from the generated ranking of content sources relative to the first content source.

4. The system of claim 1, wherein the computer system separate from the plurality of remotely-located clients is configured to:
receive, in response to at least one of the plurality of content sources experiencing a service outage, an outage notification from the at least one of the plurality of content sources; and
remove the at least one of the plurality of content sources from consideration during a period of time corresponding to the service outage.

5. The system of claim 4, wherein the computer system separate from the plurality of remotely-located clients is configured to send, to the plurality of remotely-located clients, the outage notification.

6. The system of claim 1, wherein the computer system separate from the plurality of remotely-located clients is configured to remove the first content source from consideration for a remaining portion of the given streaming session in response to determining that the first content source has failed to meet at least one of the one or more quality metrics.

7. The system of claim 6, wherein the computer system separate from the plurality of remotely-located clients is configured to re-check a viability of the first content source with respect to the at least one of the one or more quality metrics that were previously failed, and wherein the computer system is further configured to restore the first content source into consideration in response to determining that the first content source has subsequently met the one or more quality metrics that were previously failed.

8. A computer implemented method, comprising:
receiving, at a computer system from a plurality of clients, wherein the computer system is separate from the plurality of clients, quality metrics for a plurality of streaming content sessions, each quality metric indicating a measure of quality of playback of streamed content of the streaming content sessions;
generating, at the computer system separate from the plurality of clients, a ranking of content sources based on at least some of the quality metrics, wherein a given ranking specifies multiple content sources each ranked on expected quality of a streaming content session between a respective content source and a respective client; and
providing the generated ranking of content sources to one or more clients for use in selecting, during a first portion of a given streaming content session and in response to performance degradation of a first content source, a second content source to switch to for a second portion of the given streaming session.

9. The computer implemented method of claim 8, wherein receiving the quality metrics further comprises evaluating a given streaming content session based on one or more of:
a network throughput metric indicating whether a network throughput of a content source associated with the given streaming content session met or exceeded a threshold value,
a reliability metric indicating whether a playback failure occurred during the content session,
a rebuffering metric indicating whether a content stream was rebuffered one or more times during content playback, or
a video quality metric indicating whether a content stream was played back at a requisite resolution.

10. The computer implemented method of claim 8, wherein selecting the second content source comprises selecting a next-highest ranked content source from the generated ranking of content sources relative to the first content source.

11. The computer implemented method of claim 8, further comprising:
receiving, by the computer system separate from the plurality of remotely-located clients and in response to at least one of the plurality of content sources experiencing a service outage, an outage notification from the at least one of the plurality of content sources; and removing the at least one of the plurality of content sources from consideration during a period of time corresponding to the service outage.

12. The computer implemented method of claim 11, sending, by the computer system separate from the plurality of remotely-located clients, the outage notification to the plurality of remotely-located clients.

13. The computer implemented method of claim 8, further comprising removing, by the computer system separate from the plurality of remotely-located clients, the first content source from consideration for a remaining portion of the given streaming session in response to determining that the first content source has failed to meet at least one of the one or more quality metrics.

14. The computer implemented method of claim 13, further comprising re-checking, by the computer system separate from the plurality of remotely-located clients, a viability of the first content source with respect to the at least one of the one or more quality metrics that were previously failed, wherein the computer system is configured to restore the first content source into consideration in response to determining that the first content source has subsequently met the one or more quality metrics that were previously failed.

15. A non-transitory computer-readable storage medium, storing program instructions computer-executable by one or more processors or circuitry to:

receive, at a computer system and from a plurality of clients, wherein the computer system is separate from the plurality of clients, quality metrics for a plurality of streaming content sessions, each quality metric indicating a measure of quality of playback of streamed content the streaming content sessions;

generate, at the computer separate from the plurality of clients, a ranking of content sources based on at least some of the quality metrics, wherein a given ranking specifies multiple content sources each ranked on expected quality of a streaming content session between a respective content source and a respective client; and provide the generated ranking of content sources to one or more clients for use in selecting, during a first portion of a given streaming content session and in response to performance degradation of a first content source, a second content source to switch to for a second portion of the given streaming session.

16. The non-transitory computer-readable storage medium of claim 15, wherein the quality metrics for a given streaming content session include one or more of:

a network throughput metric indicating whether a network throughput of a content source associated with the given streaming content session met or exceeded a threshold value, a reliability metric indicating whether a playback failure occurred during the content session, a rebuffering metric indicating whether a content stream was rebuffered one or more times during content playback, or a video quality metric indicating whether a content stream was played back at a requisite resolution.

17. The non-transitory computer-readable storage medium of claim 15, wherein the second content source comprises a next-highest ranked content source from the generated ranking of content sources relative to the first content source.

18. The non-transitory computer-readable storage medium of claim 15, wherein the computer system separate from the plurality of remotely-located clients is configured to:

receive, from at least one of the plurality of content sources and in response to the at least one of the plurality of content sources experiencing a service outage, an outage notification; and remove the at least one of the plurality of content sources from consideration during a period of time corresponding to the service outage.

19. The non-transitory computer-readable storage medium of claim 15, wherein the computer system separate from the plurality of remotely-located clients is configured to remove the first content source from consideration for a remaining portion of the given streaming session in response to determining that the first content source has failed to meet at least one of the one or more quality metrics.

20. The non-transitory computer-readable storage medium of claim 19, wherein the computer system separate from the plurality of remotely-located clients is configured to re-check a viability of the first content source with respect to the at least one of the one or more quality metrics that were previously failed, and wherein the computer system is further configured to restore the first content source into consideration in response to determining that the first content source has subsequently met the one or more quality metrics that were previously failed.

\* \* \* \* \*